United States Patent [19]
Arens

[11] 4,428,321
[45] Jan. 31, 1984

[54] THERMALLY-ACTIVATED TIME-TEMPERATURE INDICATOR

[75] Inventor: Robert P. Arens, North St. Paul, Minn.

[73] Assignee: Minnesota Mining and Manufacturing Co., St. Paul, Minn.

[21] Appl. No.: 321,372

[22] Filed: Nov. 16, 1981

[51] Int. Cl.³ .................... G01N 33/02; G01K 1/02
[52] U.S. Cl. ................... 116/217; 116/207; 252/408.1; 252/962; 426/88
[58] Field of Search ............... 116/207, 206; 374/162, 374/160; 422/55; 252/962

[56] References Cited

U.S. PATENT DOCUMENTS

| | | | |
|---|---|---|---|
| 2,299,991 | 10/1942 | Kallock | 346/1.1 |
| 2,560,537 | 7/1951 | Andersen | 116/207 X |
| 2,782,749 | 2/1957 | Beckett et al. | 116/207 |
| 3,031,328 | 4/1962 | Larsen | 117/36.7 |
| 3,065,083 | 11/1962 | Gessler | 99/192 |
| 3,118,774 | 1/1964 | Davidson et al. | 93/192 |
| 3,243,303 | 3/1966 | Johnson | 99/192 |
| 3,414,415 | 12/1968 | Broad, Jr. | 99/192 |
| 3,508,344 | 4/1970 | Thomas | 35/9 |
| 3,946,612 | 3/1976 | Sagi et al. | 374/160 X |
| 3,954,011 | 5/1976 | Manske | 116/207 X |
| 4,022,706 | 5/1977 | Davis | 374/162 X |
| 4,070,912 | 1/1978 | McNaughtan | 374/162 |
| 4,150,572 | 4/1979 | Lindquist | 252/962 X |
| 4,188,437 | 2/1980 | Rohowetz | 116/207 X |
| 4,232,552 | 11/1980 | Hof et al. | 116/217 X |
| 4,258,000 | 3/1981 | Obermayer | 422/55 |
| 4,268,413 | 5/1981 | Dabisch | 116/207 X |
| 4,299,880 | 11/1981 | Arens | 428/304 |
| 4,318,436 | 3/1982 | Shurman | 116/207 X |
| 4,339,207 | 7/1982 | Hof et al. | 374/160 |

*Primary Examiner*—Daniel M. Yasich
*Attorney, Agent, or Firm*—Donald M. Sell; James A. Smith; Richard E. Brink

[57] ABSTRACT

Device which visually indicates exposure to a temperature within a predetermined range for a predetermined length of time. An opaque microporous sheet has a colored stratum on the back and a transparent fusible coating on the face. The coating is a solid solution of amorphous rubbery polymer in crystallizable solvent which, upon melting, gradually penetrates and transparentizes the microporous layer, rendering the colored stratum visible.

9 Claims, 4 Drawing Figures

THERMALLY-ACTIVATED TIME-TEMPERATURE INDICATOR

BACKGROUND OF THE INVENTION

This invention relates to time-temperature indicators and is particularly concerned with devices which indicate exposure time above a threshold temperature.

For at least the past forty years there has been a desire for a simple means to determine whether an article's exposure to a temperature at or above a predetermined threshold has exceeded a predetermined time limit. Such information is of interest, for example, in determining whether frozen foods have thawed, and much of the prior art has been concerned with this problem. One threshold temperature indicating device, operating substantially independent of time, is shown in U.S. Pat. No. 2,269,035, where a colored paper is provided with an opaque coating of a powdered sharp-melting compound dispersed in a polymeric carrier. Exposure to a temperature above the melting point fuses the compound, rendering it transparent and permitting the colored backing to be seen. Other devices, taking both time and temperature into account, have been based on the fact that a low-melting solid will, upon melting, wick along a porous substrate such as filter paper, cardboard, etc., at a predictable rate, the distance of travel thus being directly related to the time the substance was in liquid form. Illustrative devices incorporating this general principle are shown in U.S. Pat. Nos. 3,414,415, 2,560,537, 2,782,749, 3,118,774, and 3,243,303.

Another time-temperature indicating device, shown in U.S. Pat. No. 3,065,083, is a two-compartment envelope containing a colorless indicator dye separated from a solid fatty acid by a fat-soluble isobutylene: styrene barrier film. When the envelope is heated to a sufficiently high temperature, the acid melts, slowly dissolves the film, and reacts with the indicator dye, causing a color change.

In more recent times, modern technology has imposed new requirements for time-temperature indicating devices. For example, the so-called "fast food" chains, which specialize in the mass production of specific food items, pride themselves on making certain that the food is served while it is still fresh. Thus, a freshly prepared hamburger sandwich is placed in a heated holding area, and, unless it is sold within 10 minutes, it is thrown away. It is difficult for a busy worker to remember when each sandwich has been placed in the holding area, and there thus exists a desire for an inexpensive means to indicate visually the aging of each individual sandwich.

It is believed that none of the time-temperature indicators of the prior art is suitable for the use described in the preceding paragraph, all such prior art devices being more complicated and expensive than the use will permit, unsuitable for the temperature range involved, lacking in customer appeal, incapable of reacting within a brief but finite time span, etc.

BRIEF DESCRIPTION OF THE DRAWING

Attention is directed to the accompanying drawing, in which.

BRIEF STATEMENT OF THE INVENTION

Figure 1:
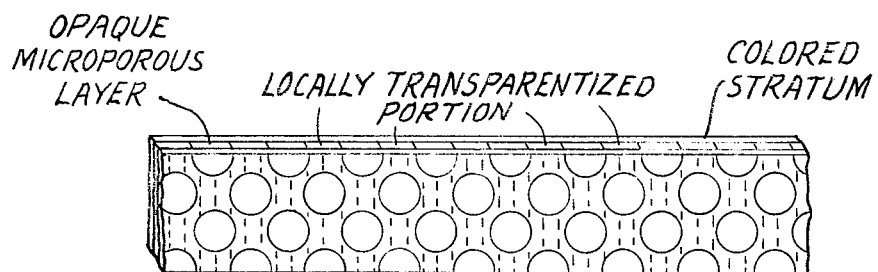
FIG. 1 is a perspective view of a presently preferred article made in accordance with the invention, prior to use.
Figure 2:
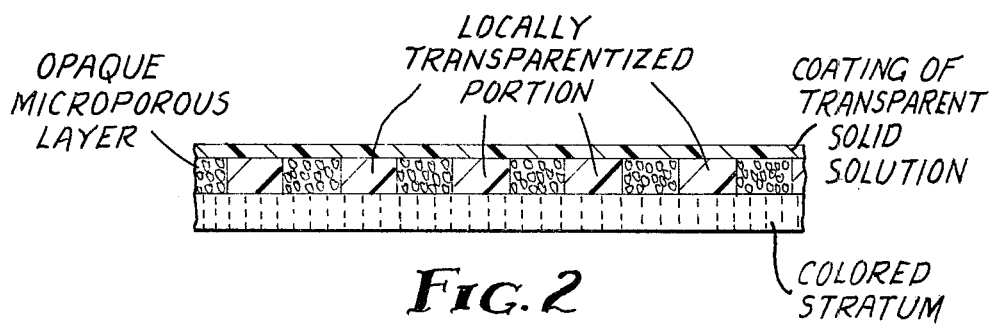
FIG. 2 is a cross-sectional view of the article of FIG. 1, enlarged to facilitate understanding.
Figure 3:
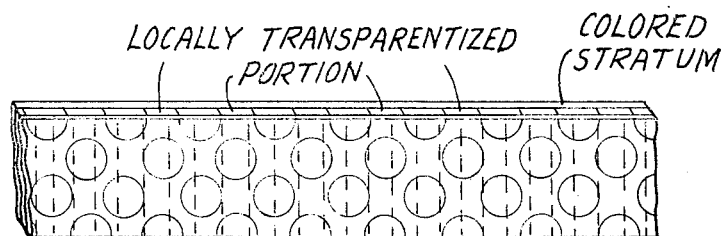
FIG. 3 is a perspective view of the article of FIG. 1, after use.
Figure 4:
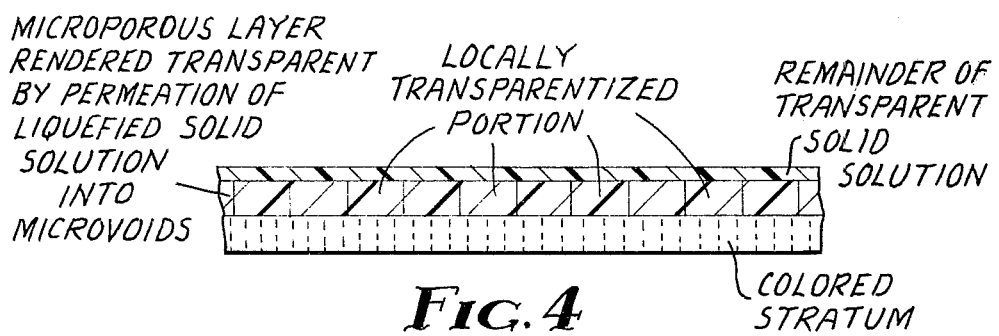
FIG. 4 is a cross-sectional view of the article of FIG. 3, enlarged to facilitate understanding.

The present invention provides a simple, reliable, and inexpensive way to determine when a permissible time within a predetermined temperature range has been exceeded. Articles of the invention are particularly adapted for use in the fast food industry, where they can be readily attached to a wrapper to indicate whether an individual food product has exceeded the brief permissible time between preparation and serving.

The invention thus comprises an article for irreversibly displaying visual evidence of exposure within a predetermined temperature range for at least a predetermined length of time. The article comprises in combination a. an opaque open cell microporous diffusely light-reflective layer having first and second surfaces and being formed of components which will not melt at the upper end of the predetermined temperature range, b. a colored stratum firmly joined to the first surface of the microporous layer, and c. overlying, but not appreciably penetrating, at least a portion of the second surface of the microporous layer, a substantially transparent coating of a composition comprising a solid solution of (1) an amorphous rubbery polymer having a glass transition temperature below the lower end of the predetermined temperature range, dissolved in (2) a crystallizable solvent for the rubbery polymer, the solvent having a melting point below the lower end predetermined temperature range.

The solvent:polymer ratio is selected to control viscosity and thus assure penetration of the entire depth of the microporous layer by the composition at the expiration of the predetermined length of time in the temperature range.

For convenience in attaching articles of the type just described to products whose time-temperature history is to be monitored, it is desirable to provide, over at least a portion of the surface opposite that on which the transparent coating is applied, a normally tacky and pressure-sensitive adhesive, thereby obtaining a form of pressure-sensitive adhesive tape. In such constructions, the solid solution functions as a low adhesion backsize, enabling the tape to be wound convolutely upon itself about a core and subsequently unwound without adhesive transfer; a typical force to unwind such a roll of tape is about 20 g/cm width.

In a typical use, a product of the type just described is adhered to the exterior surface of the wrapping of a freshly prepared hamburger, which is then placed in a heated holding area having a temperature of 145° F.±5° F. (approximately 63° C.±3° C.). Below 60° C. the crystallizable solvent melts, "activating" the composition, so that within the 60°–66° C. temperature range, the amorphous polymer:crystallizable solvent composition is a viscous liquid solution which gradually penetrates the microporous layer. Since the refractive index of the composition is essentially the same as that of the solid component in the microporous layer, the microporous layer gradually becomes transparent. When the composition has penetrated substantially the entire depth of the microporous layer, the resulting transparency reveals the underlying colored stratum, indicating that the permissible time of retention for the hamburger has expired. The product may be sold any time before such visual indication has taken place but not thereafter.

Opaque microporous layers, suitable for use in the practice of the invention, are known to the art. In this regard, attention is directed to applicant's copending U.S. Patent Application Ser. No. 94,645, now U.S. Pat. No. 4,299,880, which discloses a preferred structure in which the microvoidcontaining layer consists essentially of particles held in pseudo-sintered juxtaposition by a thermoset binder. Other opaque microporous layers include, i.e., those shown in U.S. Pat. Nos. 2,299,991, 3,031,328, and 3,508,344; in some circumstances, certain filter paper may also be employed. The prior art describes providing a microporous layer with a colored support stratum and the subsequent application of a liquid having a refractive index closely approximately that of the solid components in the microporous layer, thereby transparentizing the microporous layer and rendering the colored support stratum visible. No such art, however, suggests the application of a composition which is a non-penetrating solid that is meltable to a liquid penetrating state, let alone a solid composition in which an amorphous polymer is dissolved in a crystalline solvent.

DETAILED DESCRIPTION

Understanding of the invention will be further enhanced by referring to the following illustrative but non-limiting examples, in which all parts are by weight unless otherwise specified.

In each of Examples 1–6 below, a microvoidforming composition was prepared by mixing 18.12 parts toluene, 3.62 parts diisobutylketone, 1.11 parts cellulose acetate butyrate (Eastman CAB 500-1), 7.25 parts methyl isobutyl ketone, 10.00 parts of a 60% solution of hydroxy functional acrylic resin (Henkel Co. "G-Cure 868 RX-60"), 58.00 parts 5-micrometer silica (Pennsylvania Sand Glass Corporation "Min-U-Sil"), and 1.90 parts of a 75% solution of 1,6-hexamethylene diisocyanate in 1:1 xylene:2-ethoxy acetate (Mobay "Desmodur" N-75). This composition was then coated onto the surface of black 60-micrometer grease-proof paper and allowed to dry and cure at room temperature for 10 days; the dried layer was microporous and approximately 12.7 micrometers thick.

A varnish was applied to the surface of the microvoid, coating in a pattern of 2.5-millimeter wide diagonal lines spaced about 6.4 millimeters apart. The transparentizing effect resulted in an initial pattern of black or reference lines on a white background, evaporation of the solvent causing the lines to appear dark gray. The varnish formed a film, sealing the pores and thus preventing subsequent penetration by the liquified fusible layer.

A family of fusible compositions was prepared by blending various ratios of polyisobutylene having a glass transition temperature of about −65° C. and a number average molecular weight in the range of 81,000–99,000 ("Vistanex" L-100) and paraffin wax ("Shellwax" 100) having a melting point of 125° F. (roughly 50° C.) and dissolving in toluene to form a 25% solids solution. Each such solution was knife coated onto a release liner using a 125-micrometer slot and dried at about 93° C. The molten coating was then chilled to solidify it and form a solid solution of the polyisobutylene and paraffin wax. The solid coating was then placed in contact with the surface of the stripecoated microporous layer and laminated thereto by passing the layers between squeeze rolls (one rubber, one steel), both internally heated to a temperature of about 52° C., a pressure of about 485 N/cm width, and a rate of about 2 m/min, the exact conditions being varied controllably to ensure good bonding of the fusible coating to the microporous layer with negligible penetration.

Examples 7–11 below were prepared in the same manner as Examples 1–6 except for the microvoidforming layer and the composition used in printing the lines. The microvoid-forming layer was made by blending 77.39 parts toluene, 11.18 parts diisobutylketone, 22.37 parts methylisobutylketone, 44.47 parts of a 60% solution of hydroxy-functional acrylic resin (Henkel Co. "G-Cure 868 RX-60"), 0.9 part di(dioctylpyrophosphate) ethylene titanate, 466 parts 0.5-15 micrometer calcium carbonate (Sylacauga Calcium Products "Microwhite" 25), and 7.9 parts of a 75% solution of 1,6-hexamethylene diisocyanate. The dried thickness of the microvoid layer was 25 micrometers. Stripes were printed using a lacquer containing a small amount of carbon black.

Strips (about 2.5 cm × 12.7 cm) of the product of each example were now hung in a circulating air oven maintained at specified temperatures ±1° F. (±.6° C.) and observed through a transparent door until the initially white surface became indistinguishable from the gray stripes, indicating that the coating composition had penetrated the microvoids, transparentizing the layer and making the underlying black greaseproof paper visible. Continued exposure to the over temperature caused further darkening, so that wide black stripes were visible between the narrow printed dark gray stripes. Results are summarized below:

TABLE 1

| Example | Polyisobutylene: paraffin ratio | °F. °C. | 115 46.1 | 125 51.7 | 130 54.4 | 135 57.2 | 140 60.0 | 145 62.8 | 150 65.7 | 155 68.3 | 160 71.1 | 200 93.3 | 250 121. |
|---------|--------------------------------|---------|------|------|------|------|------|--------|------|------|------|------|------|
| Control | 0:100 | | — | — | — | — | 0.1 | 0.1 | — | — | — | — | — |
| 1 | 20:80 | | — | 13 | — | 11 | — | 10 | — | 9 | 8 | 6 | 4 |
| 2 | 22.22:77.78 | | — | — | 15 | — | 13 | 12 | 11 | — | 9 | — | — |
| 3 | 30:70 | | — | 117 | — | 111 | — | 104 | — | 96 | 92 | 53 | — |
| 4 | 40:60 | | — | — | — | — | — | 1,440 | — | — | — | — | — |
| 5 | 50:50 | | — | — | — | — | — | 10,000 | — | — | — | — | — |
| 6 | 60:40 | | — | — | — | — | — | 80,640 | — | — | — | — | — |
| 7 | 17.78:82.2 | | — | — | — | — | — | 7 | — | — | — | — | — |
| 8 | 18.60:81.40 | | — | — | — | — | — | 8 | — | — | — | — | — |
| 9 | 19.50:80.50 | | — | — | — | — | — | 9 | — | — | — | — | — |
| 10 | 20.50:79.50 | | — | — | — | — | — | 10 | — | — | — | — | — |

TABLE 1-continued

| Example | Polyisobutylene: paraffin ratio | °F. °C. | 115 46.1 | 125 51.7 | 130 54.4 | 135 57.2 | 140 60.0 | 145 62.8 | 150 65.7 | 155 68.3 | 160 71.1 | 200 93.3 | 250 121. |
|---|---|---|---|---|---|---|---|---|---|---|---|---|---|
| | | | \multicolumn{12}{c}{Time, minutes, to match dark gray stripes at temperature indicated} |
| 11 | 22.72:77.78 | | — | — | — | — | — | 33 | — | — | — | — | — |

It is apparent that the length of time required to change color at a given temperature is dependent on the polyisobutylene:paraffin ratio. It also appears that the presence of the polyisobutylene may reduce the effect of temperature above the threshold value on rate of color change. The tabulated values should be considered typical, but they are subject to change with variation in the type and thickness of microvoid layer, the molecular weight of the polyisobutylene, and the melting point of the crystalline solvent. For the system shown, however, a 1:5 polyisobutylene-paraffin ratio is considered desirable for displaying an exposure to a temperature of 60° C.±2° for about 10 minutes.

EXAMPLE 12

A time-temperature indicating article similar to that in Example 2 was prepared. The microvoid-forming composition was obtained by blending 58.80 parts toluene, 5.15 parts vinyl toluene:butadiene (Goodyear "Pliolite" VT), 5.15 parts diphenyl phthalate, and 30.90 parts reagent grade powdered magnesium carbonate. The product was coated on greaseproof paper and dried as in Example 2, after which the thickness of the microvoid layer was found to be approximately 50 micrometers. A fusible composition was then coated over the microvoid layer as in Example 2, except that the isobutylene:paraffin wax ratio was 23.4:76.6. When placed in an air circulating oven maintained at 100° C., the article displayed a color change at 4 minutes.

EXAMPLE 13

A time-temperature indicating article similar to that of Example 8 was prepared. The colored stratum, however, was a 127-micrometer black greaseproof and waterproof film. Additionally, the microvoid-forming composition was prepared by blending 0.91 part sodium alginate, 90.83 parts water, and 8.26 parts powdered (0.04 micrometer equivalent spherical diameter) calcium carbonate (HM Royal "Homocal" D). After coating and drying as in the preceding examples, the thickness of the resultant microvoid layer was found to be approximately 23 micrometers. Samples of the resultant product, when placed in an air circulating oven maintained at 100° C., displayed color change at 8 minutes.

EXAMPLE 14

A time-temperature indicating article similar to that of Example 3 was prepared. The microvoid-forming composition was prepared by blending 57.19 parts "Min-U-Sil" silica, 2.97 parts of a 65% solution of oil-free reactive alkyd resin (Ashland Chemicals Co. "Aroplaz" 6022-R-65), 1.28 parts mixed aromatic solvents (boiling point c./50° C.), 0.37 part methyl heptyl ketone, 1.72 parts "Desmodur" N-75 diisocyanate solution, 27.90 parts xylene, 6.86 parts ethylene glycol monobutyl ether, 0.57 part γ-glycidoxypropyl trimethoxysilane, and 1.14 parts CAB 500-1 cellulose acetate butyrate. After coating and drying as in the preceding examples, the thickness of the microvoid layer was found to be approximately 28 micrometers. A 21:79 polyisobutylene:paraffin wax composition of the type previously described was coated over the microvoid layer as described in preceding examples. When placed in a 145° F. (approximately 65° C.) circulating air oven, color change occurred at 8 minutes.

EXAMPLE 15

A time-temperature indicating article, substantially the same as those of Examples 7–11 was prepared, except that the fusible layer was formed from a 20:80 cis-polybutadiene:paraffin blend. Rates of color change at various temperatures are shown below:

| Temperature | °F. °C. | 115 46.1 | 130 54.4 | 145 62.8 | 160 71.1 |
|---|---|---|---|---|---|
| Time to Change Color, Minutes | | >360 | 9 | 5 | 3 |

EXAMPLES 16–19

Time-temperature indicating articles, substantially the same as those of Examples 7–11 except that a higher melting paraffin was used in the fusible layer, were prepared. The paraffin ("Shellwax" 200) had a melting point of 141° F. (60.6° C.). When subjected to the test previously described, no color change occurred at 130° F. (54.4° C.) or less. Rate of color change at 160° F. (68.2° C.) is shown below.

| Example | Polyisobutylene: Paraffin Ratio | Time, Minutes, to Show Full Color Change |
|---|---|---|
| Control | 0:100 | 0.1 |
| 16 | 17.78:82.22 | 6.0 |
| 17 | 18.60:81.40 | 6.5 |
| 18 | 19.50:80.50 | 7.0 |
| 19 | 20.50:79.50 | 7.5 |

EXAMPLE 20

A solution was prepared by dissolving, in 300 parts toluene, 15.1 parts of polyisobutylene ($T_g$ of −60° C., molecular weight in the range of 64,000–81,000, commercially available as "Vistanex" 80) and 84.9 parts of paraffin wax (melting point 52° C.). The solution was knife-coated on a silicone release liner and the solvent evaporated. The dried fusible composition was then laminated to one side of a sheet of 180-micrometer loose texture filter paper ("Whatman" 4), using the same general procedure as in Example 1.

Into a 25% solids solution of 95.5:4.5 isooctyl acrylate:acrylic acid copolymer pressure-sensitive adhesive in 70:30 heptane:isopropanol was mixed sufficient finely divided carbon black to constitute 14% of the total solids. The resultant black adhesive solution was knife-coated (125-micrometer slot) onto a silicone-coated release liner and the solvent evaporated. The dried black adhesive layer was then laminated to the other side of the filter paper.

The product could be wound convolutely on itself in roll form and unwound without adhesive transfer, the fusible layer functioning as a low adhesion backsize. The black adhesive layer not only enabled the product to be conveniently mounted in a desired location but also provided the colored stratum necessary for the visual determination of time-temperature exposure. The initially white appearance of the face side of the product of this example became black after exposure to 145° F. (about 63° C.) temperature for 10 minutes.

EXAMPLE 21

Example 7 was repeated, omitting the reference stripes and substituting for the composition used to prepare the fusible layer at 19% solids toluene solution of a 15:85 natural rubber:stearic acid (melting point 69°—70° C.) blend. The resulting product had an imaging time of 5 minutes at 165° F. (about 74° C.).

While the foregoing description sets forth illustrative examples of the invention, the discussion has not been exhaustive, and numerous modifications will occur to those ordinarily skilled in the art. To illustrate, the amorphous polymer and crystalline solvent may be milled together and extruded directly onto the surface of the microporous layer, greatly simplifying the manufacturing process.

Similarly, it will be recognized that time-temperature indicating devices for any of numerous desired temperature ranges can be prepared by judicious selection of type and molecular weight of amorphous polymers type and melting point of crystalline solvents, amorphous polymer:crystalline solvent ratios, type and thickness of microporous layers, etc.

In order to maintain a fairly constant time for color change to occur throughout the predetermined temperature range, it is important that the glass transition temperature ($T_g$) of the amorphous polymer be less than the lower end of the temperature range. Desirably, the $T_g$ should be substantially lower, e.g., 50° C. or more below the lower end of the range.

EXAMPLE 22

A construction identical to that described in Example 10 was prepared except that the printed lines were formed using a solution of 61.24% methyl isobutyl ketone, 0.01% Oil Blue A dye, 2.75% oleophobic fluorochemical $[C_8F_{17}SO_2N(CH_3)C_2H_4OCH_2CH(CH_2Cl)O_2CCH_2CH_2]_2$, and 36% of a dark gray flexographic printing ink (Consolidated FA-14889). The lines were a dark gray but did not physically block the pore openings of the microvoid layer as in other examples. The oleophobic nature of the lines did, however, prevent penetration of liquified fusible layer. (It is important that the liquified fusible material not penetrate the printed lines; if it does penetrate the lines, the lines become darker, making it hard to determine the end point.)

What is claimed is as follows:

1. An article for irreversibly displaying visual evidence of exposure within a predetermined temperature range for at least a predetermined length of time, comprising in combination:
   a. an opaque open cell microporous diffusely light-reflective layer having first and second surfaces and being formed of components which will not melt at the upper end of said predetermined temperature range,
   b. a colored stratum firmly joined to the first surface of said microporous layer, and
   c. overlying, but not appreciably penetrating, at least a portion of the second surface of said microporous layer, a substantially transparent coating of a composition comprising a solid solution of
      (1) an amorphous rubbery polymer having a glass transition temperature below the lower end of said predetermined temperature range, dissolved in
      (2) a crystallizable solvent for said rubbery polymer, said solvent having a melting point below the lower end of said predetermined temperature range, the solvent:polymer ratio being selected to control viscosity and assure wicking penetration of the entire depth of said microporous layer by said composition at the expiration of said predetermined length of time in said temperature range to thereby make the colored stratum visible.

2. The article of claim 1 wherein the amorphous polymer is polyisobutylene and the crystalline solvent is paraffin wax.

3. The article of claim 2 wherein the paraffin wax has a melting point of about 50° C.

4. The article of claim 3 wherein the amorphous polymer:crystalline solvent weight ratio is about 1:5.

5. The article of claim 1 or 2 wherein at least one reference mark, of generally the same color as the colored stratum, is visible at the second surface of the microporous layer.

6. The article of claim 1 or 2 wherein the colored stratum is an opaque sheet.

7. The article of claim 6 wherein normally tacky and pressure-sensitive adhesive covers the exposed surface of the colored stratum.

8. The article of claim 1 or 2 wherein the colored stratum is a normally tacky and pressure-sensitive adhesive.

9. The article of claim 7 in elongate strip form wound convolutely upon itself about a core to form a roll of tape.

* * * * *